United States Patent
Newman et al.

[11] Patent Number: 6,024,003
[45] Date of Patent: Feb. 15, 2000

[54] SELECTIVE VACUUM GRIPPER

[75] Inventors: Wyatt S. Newman, Cleveland Hts;
James D. Cawley, Shaker Heights;
Arthur H. Heuer, Cleveland, all of Ohio

[73] Assignee: Case Western Reserve University, Cleveland, Ohio

[21] Appl. No.: 09/136,537

[22] Filed: Aug. 19, 1998

Related U.S. Application Data

[62] Division of application No. 08/622,551, Mar. 25, 1996, Pat. No. 5,883,357.

[51] Int. Cl.[7] .................................................. B26D 7/18
[52] U.S. Cl. ............................ 83/24; 83/100; 83/152
[58] Field of Search ........................... 83/152, 451, 941, 83/940, 167, 24, 100; 414/744.5; 901/17, 40; 269/21, 40

[56] References Cited

U.S. PATENT DOCUMENTS

| | | | |
|---|---|---|---|
| 3,589,224 | 6/1971 | Frantzen | 83/100 |
| 5,036,736 | 8/1991 | Hillock et al. | 83/100 X |
| 5,261,305 | 11/1993 | Nasu | 83/940 X |
| 5,374,091 | 12/1994 | Gore et al. | 901/40 X |
| 5,385,441 | 1/1995 | Swapp et al. | 414/627 |
| 5,492,582 | 2/1996 | Ide et al. | 83/152 X |

*Primary Examiner*—Rinaldi I. Rada
*Assistant Examiner*—Ana Luna
*Attorney, Agent, or Firm*—Fay, Sharpe, Fagan, Minnich & McKee

[57] ABSTRACT

An apparatus for forming an integral three-dimensional object from a plurality of individual laminations includes a cutting surface on which each of the laminations is individually deposited. A concentrated energy source cuts each of the plurality of laminations into a shape required for assembly of the laminations into the integral three-dimensional object. A transfer mechanism removes each of the cut laminations from the cutting surface and stacks each of the cut laminations on an assembly surface. The transfer mechanism includes a gripper face having a peripheral portion and a central portion. A mask is positioned on the gripper face. The mask has an apertured central portion corresponding to the cut lamination. A source of suction communicates with the gripper face and a valve mechanism selectively draws a suction on the gripper face peripheral portion, the gripper face central portion, both or neither. An electronic control device is provided for controlling the operation of the cutting surface, the concentrated energy cutter and the transfer mechanism.

18 Claims, 3 Drawing Sheets

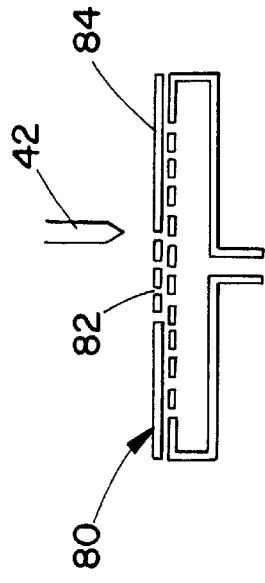
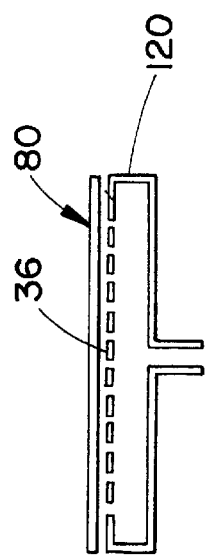
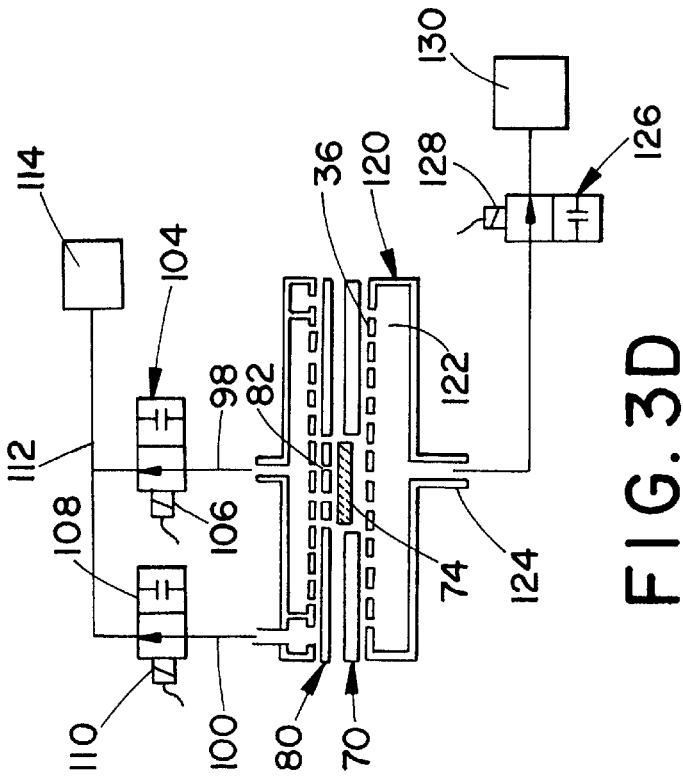
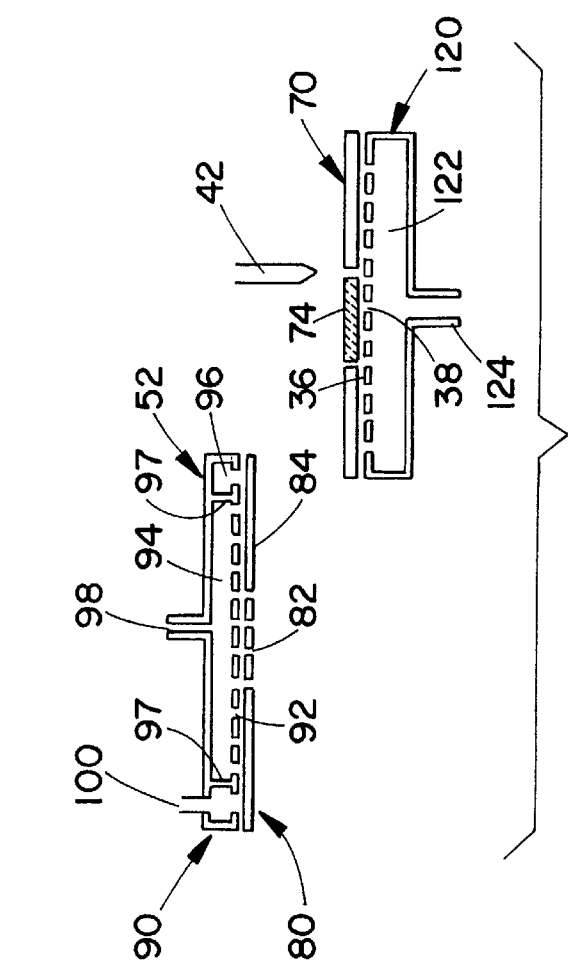

SELECTIVE VACUUM GRIPPER

This application is a division of U.S. patent application Ser. No. 08/622,551 filed on Mar. 25, 1996, now U.S. Pat. No. 5,883,357.

BACKGROUND OF THE INVENTION

This invention generally relates to material handling apparatus and methods. More particularly, the present invention relates to a transfer mechanism and a method for moving a laminate material from a first location to a second location.

This application is related to U.S. patent application Ser. No. 08/511,604 filed on Aug. 4, 1995 by the same applicants as the application herein and assigned to the same assignee. The subject matter of the earlier filed patent application Ser. No. 511,604 is incorporated hereinto by reference in its entirety.

Solid free form fabrication (SFF) includes automatic fabrication of functional prototypes and actual production of small numbers of engineering components. It has been determined that a three-dimensional object can be produced quite accurately by utilizing thin plane cross sections of a solid body as its building blocks with each of the cross sections being cut or formed separately. Each cross section can be cut by, for example, a laser located above a positioning or platter-like cutting table. The cut cross section is then picked up by a transfer mechanism and placed on a stack of other cross sections. Thereafter, the cross sections are attached to each other using suitable bonding techniques to arrive at a final three-dimensional product.

Cutting desired regions from individual sheets offers prospective advantages over techniques which cut, deposit or fuse material directly on top of a subassembly. These techniques include stereo lithography, selective laser sintering, three-dimensional printing and laminated object manufacturing. By cutting laminae individually, the geometric formation process is fully decoupled from the material processing steps, thus obviating the compromises which are inherent in either operation. The instant process is perhaps most similar to the so-called "Helisys" process of laminated object manufacturing in which laminated objects are formed from stacks of laser cut sheet material. The primary difference between the Helisys system and the instant invention is that the Helisys system stacks sheets first, then cuts outlines in the stacks of sheets. In contrast, the instant invention cuts each sheet individually and then stacks the sheets. Due to this difference, the instant invention more readily accommodates internal voids in multiple materials. However, this is at the expense of a more demanding material handling technique. In particular, the instant material handling technique introduces the additional complexity of extracting desired cross sectional regions from a larger sheet of laminate material after the desired cross section is cut from a sheet and the transfer of the desired cross section laminate onto a stack of other cut laminates.

The present invention contemplates a new and improved method and apparatus for material handling which overcomes the foregoing difficulties and others while providing better and more advantageous overall results.

BRIEF SUMMARY OF THE INVENTION

In accordance with the present invention, an apparatus is provided for forming an integral three-dimensional object from a plurality of individual laminations.

More particularly in accordance with this aspect of the invention, the apparatus comprises a cutting surface on which each of a plurality of laminations are individually deposited and a concentrated energy means for cutting each of the plurality of laminations into a shape required for assembly of the plurality of laminations into the integral three-dimensional object. A transfer mechanism is provided for removing each of the cut laminations from the cutting surface and stacking each of the cut laminations on an assembly surface. The transfer mechanism comprises a gripper face including a peripheral portion and a central portion, a source of suction communicating with the gripper face, a valving means for selectively drawing a suction on the gripper face peripheral portion, the gripper face central portion, both or neither, and a mask positioned on the gripper face. The mask has an apertured central portion corresponding to the cut lamination. An electronic means is provided for controlling the operation of the cutting surface, the concentrated energy means and the transfer mechanism.

Preferably, the mask apertured central portion comprises a plurality of spaced perforations through the mask. Preferably, the cutting surface comprises a planar face including a plurality of transverse suction apertures communicating with the source of suction and a valve for controlling the drawing of a suction on the suction apertures. Preferably, the gripper face further comprises a first conduit communicating with the peripheral portion and a second conduit communicating with the gripper face central portion.

One advantage of the present invention is the provision of a new and improved method of manufacturing an integral three-dimensional object from laminations.

Another advantage of the present invention is the provision of a method for producing three-dimensional objects utilizing a laser beam which cuts a sheet of laminate material on a cutting surface that is capable of holding the laminate material against movement as the laser cuts the material.

A further advantage of the present invention is the provision of a new and improved transfer mechanism which is capable of picking up a desired cut portion of a lamination from a cutting surface and then depositing the cut portion on a stack of other cut portions which will ultimately form the intended three-dimensional object.

A still further advantage of the present invention is the provision of a transfer mechanism for picking up a cut portion of a sheet of laminate material wherein a sheet of a mask material is positioned on a gripper face of the transfer mechanism. The mask material has an apertured portion corresponding to the cut portion of the lamination in order to allow the transfer mechanism to only pick up the cut portion and not the remainder of the laminate sheet from the cutting surface.

Still further advantages of the present invention will become apparent to those of ordinary skill in the art upon the reading and understanding of the following detailed description of the preferred embodiment.

BRIEF DESCRIPTION OF THE DRAWINGS

The invention may take form in various parts and arrangements of parts or in various steps and sequences of steps. The figures and the described structures and methods are only for the purpose of illustrating the preferred embodiment of the invention and are not to be construed as limiting same. In the figures:

FIGS. 3A–3D represent different steps in the method of creating the mask and employing the mask with the selective vacuum gripper of the transfer mechanism to pick up the cut portion of the laminate sheet from the cutting table according to the present invention; and, FIG. 4 is a flow chart illustrating the process for cutting and stacking laminate sheets according to a first preferred embodiment of the present invention.

DETAILED DESCRIPTION OF THE PREFERRED EMBODIMENT

Figure 1:
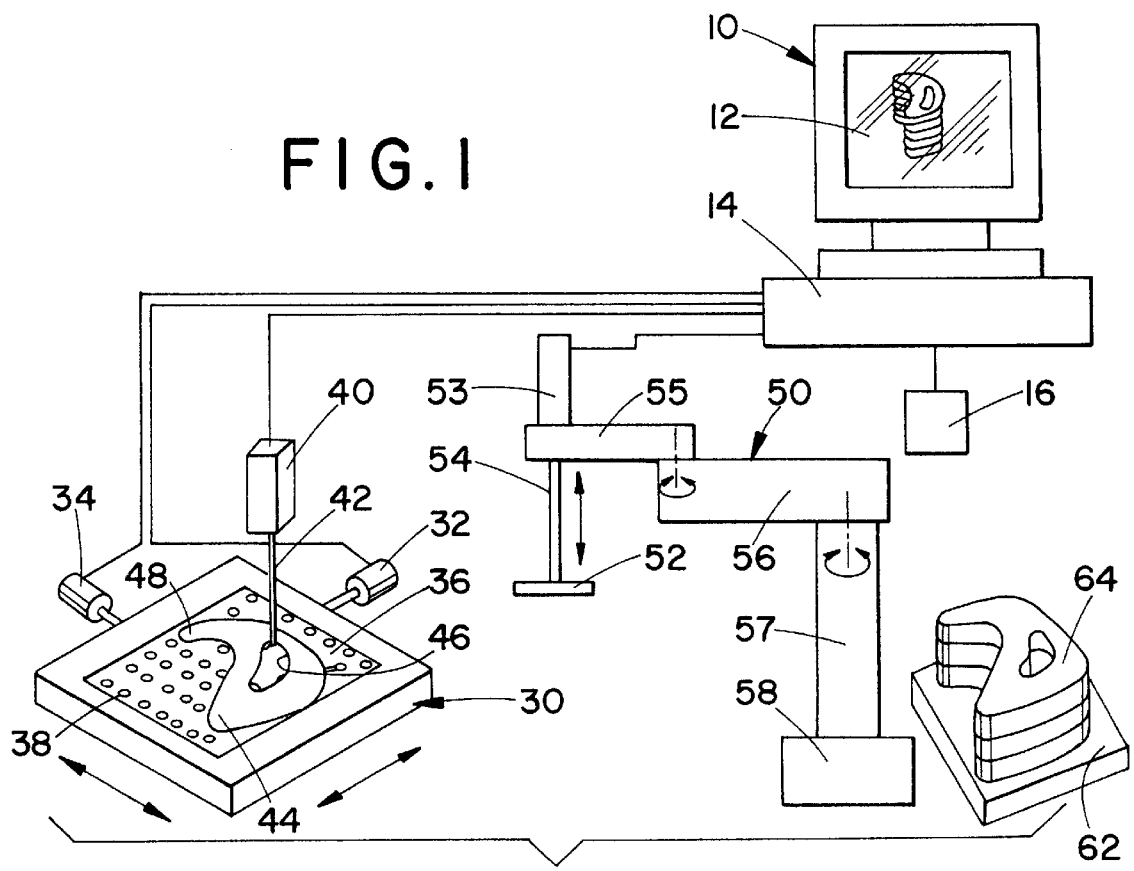
FIG. 1 is a perspective view of a computer, showing a contour representation of a three-dimensional object, a laser cutting table, having a sheet of laminate material from which a contoured portion is being cut, and a transfer mechanism for transferring the contoured portion of the lamination from the cutting table to a receiving table on which a stack of such contoured portions is being held, according to the present invention.

FIG. 1 illustrates the material handling apparatus according to the present invention as used in connection with solid free form fabrication (SFF). This method allows a direct fabrication of components of nearly arbitrary complexity using engineering materials of arbitrary composition without the need for tooling.

With reference now to FIG. 1, a computer 10 which is used in connection with the method and apparatus according to the present invention includes a CRT screen 12 and a console 14 which includes a central processing unit, a RAM memory, an I/O board and data storage capability in the form of a hard drive, as is well known in the art. An input device, which can be a keyboard or an outboard diskette drive or a direct link to a suitable additional device, is illustrated in block 16. The additional device can be, e.g., a conventional contour follower having a sensing head (not illustrated) in order to input information concerning the three-dimensional object which it is desired to reproduce from laminations.

The computer 10 controls the operation of an X-Y platform 30 via an X axis control means 32 and a Y axis control means 34. Located on the platform is a cutting surface 36, having a plurality of spaced transverse apertures 38 therein. The computer also controls the operation of a laser cutter 40 having a beam 42 which cuts a sheet 44 of a suitable desired sheet of laminate material as shown by cut line 46, in order to obtain a suitable contoured portion 48 of the laminate sheet. Beam modulation of the laser 40 is coordinated with the trajectory of the X-Y platform 30. Both of these are controlled by the computer 10.

The laminate sheet 44 is preferably cut from an uncured tape fabricated from a desired engineering material, such as, e.g., an uncured ceramic tape as is more fully set forth in the application Ser. No. 511,604.

As is illustrated on the CRT screen 12 of FIG. 1, any three-dimensional object can be broken down into a series of parallel thin sheets with contoured edges and, in principle, the process can be reversed. That is, any arbitrary three-dimensional object can be built up from a series of parallel thin sheets with contoured edges. Thus, a set of uncured sheets 44 can be cut to form profiled sections 48 that can be assembled to build a desired shape.

The design of the cutting surface 36 is important for obtaining high quality cuts. Initially, a smooth aluminum cutting surface was used. However, this was found undesirable for a number of reasons. First, the aluminum cutting surface exhibited poor edge quality, perhaps due to reflections of the laser from the cutting surface. Further, polymeric binder material vaporized by the laser would sometimes recondense on the cutting surface further roughening the cut edges and often causing the desired part to adhere to the cutting surface and/or to the waste material. In addition, parts placed loosely on the cutting surface would be displaced by the laser's air jet flow—such air jet flow being necessary to protect the lens of the laser and to help eject debris from the laser cuts thereby improving edge finish—thereby ruining the contour of the cut portion.

Therefore, to prevent part displacement during cutting, the cutting surface plate was punctured with an array of apertures or holes 38 and a vacuum suction was applied to clamp the laminate sheet 44 to the cutting surface 36. This approach prevented part slippage but exacerbated the recondensation and adhesion problems. Alternative surfaces of wire mesh, wire cloth, acrylic plates, ceramic mesh and others were tested. However, in these cases, the rough surfaces provided too little vacuum clamping force and the smooth surfaces had problems with material condensation and adhesion.

Applicants have, therefore, turned to an aluminum "honeycomb" material—of the type commonly used in aerospace applications requiring strong, lightweight structures—as the cutting surface. This material provides good vacuum clamping and little material condensation and adhesion. Moreover, the honeycomb cutting table structure provides a sufficiently high density of support for small part feature sizes. In addition, it provides adequate ventilation beneath the laser cutting surface for debris released through laser cutting since the cell wall thickness is smaller than the laser beam diameter. Tests have shown that the laser does not cut aluminum at the power levels required to cut laminate materials. In addition, few materials tested thus far adhere to the aluminum surface. This combination of features results in a strong, robust and reliable solution to the cutting table design.

The aluminum honeycomb material of the cutting surface is supported by a backing plate held in the X, Y table 30. The backing plate can, if desired, be made from a conventional cellular ceramic material. This material has longitudinal holes extending therethrough from a top surface to a bottom surface thereof.

The desired source of aluminum honeycomb has a cell size of 1.59 mm and a wall thickness of 18 microns. This structure would seem to provide a sufficiently high density of support for small part feature sizes. It also exhibits improved erosion resistance and adequate vacuum clamping. It should also provide adequate ventilation for debris released through laser cutting since the cell wall thickness (18 microns) of the aluminum honeycomb is much smaller than the laser beam diameter (approximately 200 microns).

However, another potentially useable cutting surface would be a ceramic grid cutting surface or a metallized ceramic surface.

With further reference to FIG. 1, a material handling mechanism or assembly robot 50, according to the present invention, includes a vacuum gripper 52 which is secured to a translating means. The translating means comprises a piston and cylinder construction including a cylinder 53 in which is mounted an axially movable piston (not visible) to which is secured one end of a piston rod 54. The rod 54 has another end to which the vacuum gripper 52 is secured. The cylinder 53 is secured to a first arm 55 at a first end thereof. A second end of the first arm 55 is pivotally secured to a first end of a second arm 56. The second end of the second arm 56 is itself pivotally secured to an upper end of a post 57. The lower end of the post is rigidly secured to a base 58. With such a translating means, the second arm 56 can rotate in relation to the base 58 and the first arm 55 can rotate in relation to the second arm 56. Also, the vacuum gripper 52 can move vertically in relation to the base 58. In this fashion, the vacuum gripper 52 can pick up a cut sheet 48 from the cutting table 30 and transfer that sheet to another location. More specifically, the gripper can transfer the cut sheet to a stacking table 62 on which a stack 64 of cut sheets can be held.

Figure 2:
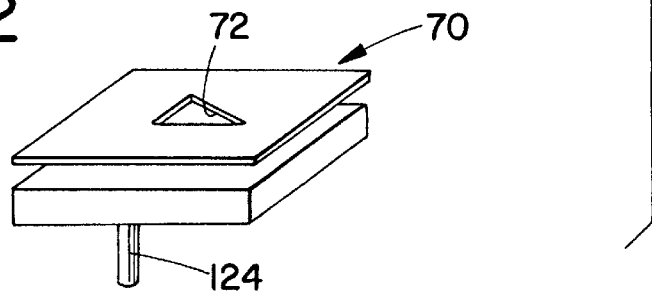
FIG. 2 is a schematic exploded perspective view of a selective vacuum gripper and a mask of the transfer mechanism and the cutting table and a laminate sheet with a cut portion according to the present invention.

FIG. 2 illustrates a sheet 70 of a laminate material. The laminate sheet is cut, as shown by cut line 72, in order to obtain a desired cut portion 74 illustrated in schematic form as a triangular portion of the sheet 70.

Originally, it was thought that a gripper plate punctured with a large number of small diameter holes in a dense array would enable the selected gripping of a laminate sheet material where a waste material surrounding the desired cut portion of the laminate sheet would be punctured in a hole pattern matching that of the gripper plate. There were a number of limitations to this approach. First, the density of holes on the gripper plate placed a limitation on the smallest parts which could be acquired or picked up by the gripper. Second, the large number of gripper plate holes led either to exorbitant vacuum pump flow rates or to impractically small diameter holes. It should be recognized that the minimum hole diameter was limited by mechanical machining constraints and by concerns that excessively small holes would clog too frequently. Yet another limitation to this approach was that a high density array of holes would require a correspondingly high density array of punctures of the waste material and this was a process consuming excessive time.

Therefore, the gripper plate 52 illustrated in FIGS. 2 and 3A–3D was devised. FIG. 2 illustrates the extraction of the hypothetical triangular portion 74 from the laminate sheet 70 lying in a cutting plane. To extract the desired triangular portion 74, a vacuum mask 80 is used. The mask 80 is punched with a hole pattern 82 overlaying the desired triangular portion. A non-porous border region 84 of the mask material precludes air flow from the gripper vacuum throughout the gripper face except in the punctured region. By aligning the masked gripper plate 52 with the desired part on the cutting surface 36, only the desired triangular portion 74 is lifted by the vacuum source but not the remaining portion of the laminate sheet.

The gripper plate 52 is schematically illustrated in FIG. 3C. The gripper plate 52 comprises a rectangular body 90 having an apertured first wall 92. The body has a central hollow region 94 communicating with the apertured wall 92 as well as a peripheral hollow region 96 surrounding the central region and separated therefrom by a transverse wall 97. The peripheral region also communicates with the apertured wall 92. A central region conduit 98 allows a suction flow through the apertured wall 92. A peripheral region conduit 100 allows a suction flow through the peripheral region of the apertured wall.

The gripper plate 52 can be made of a plexiglass sheet in which a number of spaced through holes are drilled. The plexiglass plate is then backed by a cellular ceramic material, having rectangular holes therein, much as is the cutting surface.

With reference now to FIG. 3D, the valving control structure for both the gripper plate 52 and the cutting surface 36 will now be discussed. Controlling flow through the central region conduit 98 of the gripper plate 52 is a valve 104 which can be a conventional two position on-off valve controlled by, e.g., a first solenoid 106. The peripheral region conduit 100 can similarly have a flow control valve 108 which can be an on-off valve controlled by a second solenoid 110. Both conduits 98 and 100 lead to a main conduit 112 that communicates with a vacuum source 114. By selective actuation of the valves 104 and 108, a suction can be drawn either through the central region 94 or through the peripheral region 96 of the vacuum gripper 52 as is desired. It should be appreciated that a suction can be drawn through both regions 94 and 96 or through neither region by a suitable actuation of the valves 104 and 108.

As shown in FIG. 3C, the cutting surface 36 is the top surface of a rectangular body 120. Extending through the cutting surface are the plurality of spaced apertures 38 previously discussed. Located below the apertures is a hollow region 122 which communicates with a conduit 124. As shown in FIG. 3D, flow through the conduit is regulated by a suitable conventional on-off valve 126 which may, if desired, be controlled by a third solenoid 128. The conduit 120 leads to a suitable vacuum source 130. It should be appreciated that the vacuum sources 112 and 130 can be the same source, or different sources, as may be desired. The several solenoids 106, 110 and 128 can be controlled by the computer 10 illustrated in FIG. 1.

Figure 4:
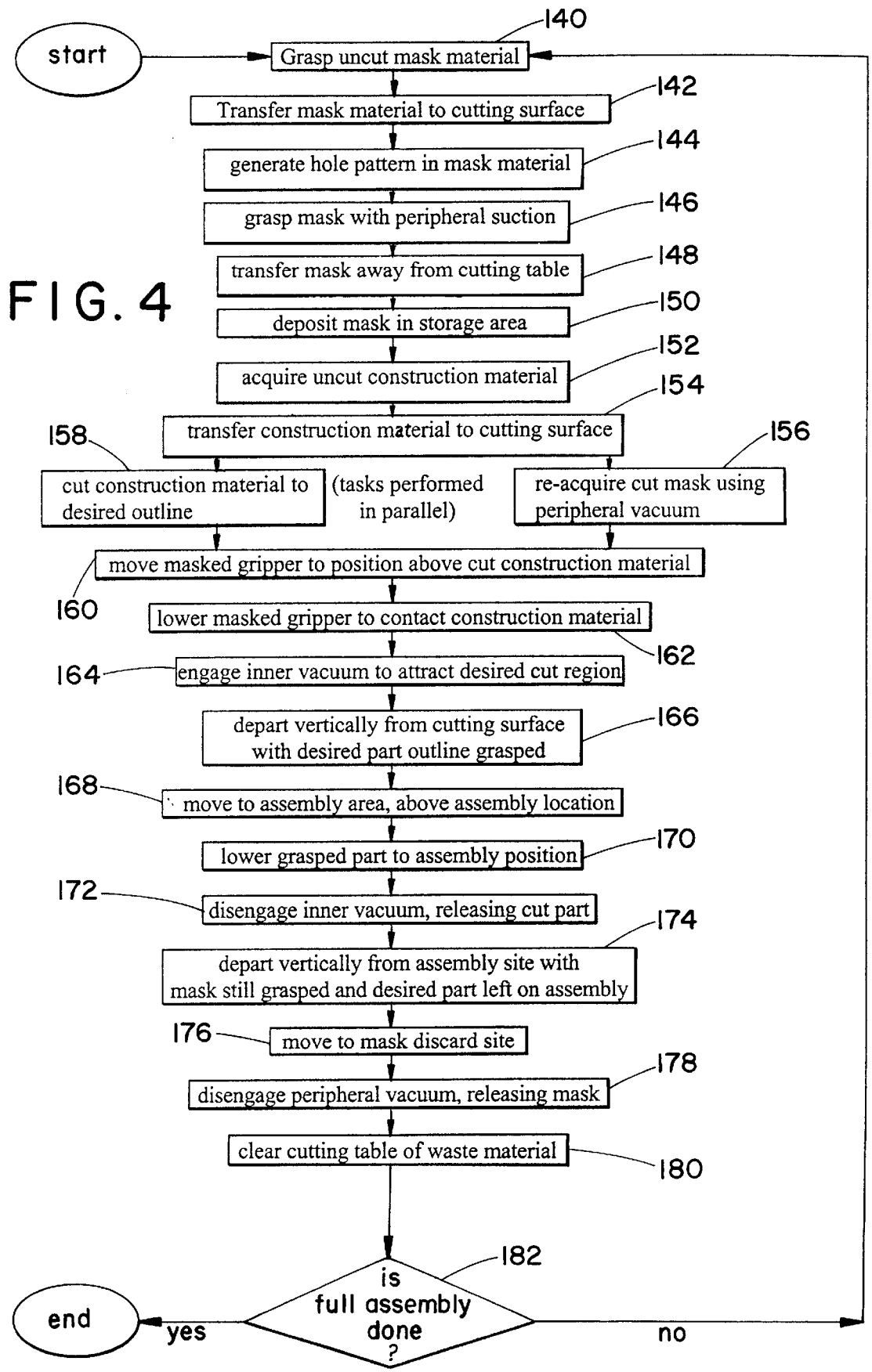

With reference now to FIG. 4, the gripper acquires an unpunctured mask 80 from a feed stack of masks (not illustrated) as shown in block 140. The gripper then places the mask material on the cutting surface 36, as is illustrated in block 142. The beam 42 of the laser then cuts a programmed hole pattern 82 in the mask, as is shown in block 144. The perimeter 84 of the mask, however, is left unpunctured. The mask is then gripped with peripheral suction, as shown in block 146, in order to lift the mask from the cutting surface. The vacuum gripper 52 then transfers the mask away from the cutting surface on the cutting table, as is illustrated in block 148. The mask is subsequently deposited in a storage area, as shown in block 150.

The gripper 52 can then be used to acquire the laminate sheet 44, as shown in block 152 and transfer this sheet to the cutting surface 36, as shown in block 154. Once the gripper has deposited the laminate material 44 on the cutting surface 36, the gripper can re-acquire the mask using peripheral vacuum as illustrated in block 156. Simultaneously, the laminate material is cut with the laser beam 42, as illustrated in block 158. Then the assembly robot 50 positions the vacuum gripper 52 with the mask in place, above the now cut laminate sheet, as illustrated in block 160. The mask gripper is now lowered to contact the cut laminate sheet, as shown in block 162.

At this stage, the gripper mask 80 is held by a vacuum source active only around the mask perimeter 84. No suction is drawn through the punctured central region 82 of the mask until it is desired to attract the cut laminate sheet portion 48, as shown in block 164. Then the piston rod 54 is raised thereby departing vertically from the cutting surface 36 with the desired part outline or cut laminate sheet portion being grasped by the gripper 52, as illustrated in block 166. The assembly robot 50 then moves the cut laminate sheet portion to the stacking table 62 above the assembly location, as illustrated in block 168. Subsequently, the piston rod 54 is again lowered in order to lower the cut laminate sheet portion to the assembly position, as shown in block 170. Then the release of the cut portion 48 or 74 is accomplished by turning off the suction in the central hollow region 94, (via valve 104) as illustrated in block 172. The gripper 52 of the assembly robot 50 is raised away from the stack of sheets 64 on the stacking table 62, as is illustrated in block 174.

Subsequently, the assembly robot can be moved to a mask discard site (not visible in FIG. 1) as is shown in block 176. The mask 80 is then discarded by disabling the flow source to the peripheral region 96 (via valve 108), as is illustrated in block 178. At this point, the mask perimeter 84 falls away from the vacuum gripper 52 and can be discarded. Then the cutting surface 36 is cleared of waste material, as shown in block 180. The computer 10 then checks to see whether the full assembly has been done, as shown in block 182. If not, the process is then repeated with the next mask and the next laminate sheet portion. On the other hand, if the full assembly is done, the process is ended.

The masked gripper approach solves a number of problems. First, since the air flow in the regions of waste laminate material is blocked by the mask 80, the air flow requirements of the vacuum pump or other vacuum source 114 are greatly reduced relative to the original gripper concept. The perforations in the mask are sealed by the desired part itself and thus the required vacuum pump flow rate for a successful grasp by the vacuum gripper 52 is quite low. In addition, the holes in the apertured portion 82 of the mask need not line up precisely with the gripper flow holes. Only some small overlap between the mask holes and the gripper flow holes is necessary. As a result, the holes punched in the mask material can be placed precisely over the regions of material to be acquired and parts smaller than the gripper plate hole spacing can be handled.

It should be appreciated that the masks 80 can often be reused. It is typically not necessary to cut a new mask for each laminate layer which is to be manipulated. In other words, a mask can be cut such that the apertured area thereof is the composite of two or more slices of the three dimensional object, whether they are consecutive slices of the three dimensional object or not. The area common to the multiple regions defines the area to be punctured in the mask. The resulting candidate mask must then be evaluated with respect to each constituent region to be manipulated in order to assure that the multipurpose mask is adequate to handle each region independently. In this way, a mask can be developed which may be used for multiple layers. This obviously would change the flow chart illustrated in FIG. 4 since, instead of the discarding the mask, the mask would be stored and the steps of acquiring uncut mask material, cutting the material and storing the cut mask while handling the laminate sheets (steps 140–150) would be bypassed when reusing a mask.

The flow chart illustrated in FIG. 4 could also be modified in other ways. For example, the construction material or laminate sheet material and mask material could be fed to the cutting table or X-Y table 30 via dedicated feeders (not illustrated). Feeding of the mask material and the uncut laminate sheets does not require precision handling and, therefore, any conventional feeders could be used for this purpose. After these materials are cut, however, it is necessary to use the assembly robot's vacuum gripper 52 to preserve the precision shaped cutting and the relative registration of the cut part 74 and the mask 80. Using dedicated sheet feeders would permit the elimination of the steps involving the acquisition of the uncut mask and the uncut construction material by the assembly robot (steps 140 and 152) and would also eliminate the need to store cut masks (step 150). Rather, a cut mask would be acquired by the assembly robot and remain on the vacuum gripper 52 while the construction material is fed and cut. This would improve accuracy—by avoiding precision reacquisition of cut masks—and would improve throughput, by eliminating unnecessary movements of the assembly robot 50.

Yet another variation would be to utilize two vacuum grippers 52 on a common assembly robot. The two vacuum grippers would permit holding mask and construction materials simultaneously. If the assembly robot could grasp both the uncut mask and the uncut construction material, the flow chart illustrated in FIG. 4 would be further modified as follows: The mask material would be acquired and deposited on the cutting surface with the first vacuum gripper. While cutting the mask, the first vacuum gripper would acquire uncut construction material. Then the second gripper would be used to acquire the cut mask. At this time, the uncut construction material would be held by the first gripper. Then the uncut construction material would be deposited on the cutting surface. While the construction material was being cut, another uncut mask sheet would be acquired using the empty gripper. Then the second gripper would be employed with its cut mask in place to acquire the desired part. The cutting surface would be cleared of waste material and the first gripper would deposit the uncut mask sheet on the cutting surface and initiate the generation of the next mask. The assembly robot would move so as to deposit the cut material on the stacking table. Then the cut mask would be discarded or stored and the robot would proceed again with acquiring uncut construction material.

It should also be appreciated that the material transfer technique discussed herein is applicable to material handling more broadly than in the context of rapid prototyping alone. Moreover, it is not necessary that the desired material be cut in the same process as the mask. Provided that there is some computer representation of the flat region to be acquired, a custom mask can be computed and fabricated for handling that object. It may be that the desired objects are formed by some other means than laser cutting, e.g., conventional stamping. Nevertheless, the manipulation requirements could be complex, e.g., equivalent to extracting jigsaw puzzle pieces from a fully formed puzzle. In such cases, the manipulation technique disclosed here is applicable independent of any rapid prototyping objectives.

Moreover, the assembly robot 50 could be used without employing a mask 80 on the vacuum gripper surface 52. For example, the assembly robot 50 discussed herein could be employed without a mask to move sheets of cardboard in a box assembly operation or metal sheets for laser welding, stamping or similar forming operations. If desired, a plurality of regions could be defined in the vacuum gripper surface with a valve controlling the suction to each. Therefore, one could have 10, 20 or 30 valves and, consequently, regions of the gripper in which suction could be selectively exerted if so desired.

The inventive cutting and stacking mechanism has been successfully tested utilizing a number of different laminate materials. These include paper, cardboard, coarse ceramic, a variety of tape cast ceramics (as more fully described in applicants' patent application Ser. No. 511,604), plastics and tapes of powdered metals. The tests show that the gripping operations are virtually independent of the type of material used. For example, identical functions, procedures and parameters can be used in picking up and stacking both sheets of paper and ceramic tape.

The invention has been described with reference to a preferred embodiment. Obviously, modifications and alterations will occur to others upon a reading and understanding of the preceding specification. It is intended that the invention be construed as including all such alterations and modifications insofar as they come within the scope of the appended claims or the equivalents thereof.

We claim:

1. A method for transferring cut laminations from a cutting surface to an assembly surface comprising the steps of:
   determining a desired outline of a portion cut from a laminate sheet;
   placing a mask on a cutting surface;
   perforating a portion of the mask in the shape of the desired outline of the laminate sheet portion;
   removing the perforated mask from the cutting surface;
   placing a laminate sheet on the cutting surface;
   cutting the laminate sheet to form the desired portion;
   placing the perforated mask on a vacuum gripper; and,
   employing the perforated mask to pick up the desired cut portion of the lamination.

2. The method of claim 1 further comprising the steps of:
   depositing the cut lamination on an assembly surface; and,
   discarding the perforated mask.

3. The method of claim 1 further comprising the step of drawing a suction through the perforated portion of the mask during said step of picking up.

4. The method of claim 1 further comprising the step of ceasing to draw a suction through the perforated portion of the mask during said step of depositing.

5. The method of claim 1 further comprising the step of drawing a suction through said cutting surface during said step of perforating a portion of the mask.

6. The method of claim 1 further comprising the step of drawing a suction through said cutting surface during said step cutting the laminate sheet.

7. A method for transferring cut laminations from a cutting surface to an assembly surface comprising the steps of:
   placing a laminate sheet on a cutting surface;
   cutting the laminate sheet in a desired outline to form a desired portion and a remainder portion,
   providing a vacuum gripper and a perforated mask having perforations arranged in the shape of the desired portion of the laminate sheet;
   placing the perforated mask on the vacuum gripper; and,
   employing the perforated mask to pick up the desired portion of the laminate sheet.

8. The method of claim 7 further comprising the step of depositing the cut lamination on an assembly surface.

9. The method of claim 8 further comprising the step of discarding the remainder portion.

10. The method of claim 8 further comprising the step of discarding the perforated mask.

11. The method of claim 7 further comprising the step of drawing a suction through the perforated portion of the mask during such step of employing the perforated mask.

12. The method of claim 7 further comprising the step of drawing a suction through said cutting surface during said step of cutting the laminate sheet.

13. The method of claim 7 further comprising the step of ceasing to draw a suction through the perforated portion of the mask during said step of depositing.

14. A method for transferring cut laminations from a cutting surface to an assembly surface comprising the steps of:
   placing a laminate sheet on a cutting surface;
   cutting the laminate sheet to form a desired portion and a remainder portion;
   placing a perforated mask on a vacuum gripper located adjacent the cutting surface, the perforated mask having perforations in the shape of the desired portion of the laminate sheet;
   drawing a suction through the perforations of the perforated mask;
   bringing the vacuum gripper adjacent to the desired portion on the cutting surface;
   picking up the desired portion from the cutting surface;
   bringing the vacuum gripper adjacent an assembly surface; and,
   ceasing to draw a suction through the perforations of the mask and depositing the desired portion on the assembly surface.

15. The method of claim 14 further comprising the step of discarding the perforated mask.

16. The method of claim 14 further comprising the steps of:
   placing a mask on a cutting surface;
   perforating a portion of the mask in the shape of a desired outline of the laminate sheet; and,
   removing the perforated mask from the cutting surface.

17. The method of claim 16 further comprising the step of drawing the suction through said cutting surface during said step of perforating a portion of the mask.

18. The method of claim 14 further comprising the step of drawing a suction through said cutting surface during said step of cutting the laminate sheet.

* * * * *